US012666420B2

(12) United States Patent
Zhu et al.

(10) Patent No.: US 12,666,420 B2
(45) Date of Patent: Jun. 23, 2026

(54) INDICATING A SLOT OFFSET CORRESPONDING TO A DOWNLINK CONTROL CHANNEL

(71) Applicant: LENOVO (BEIJING) LIMITED, Beijing (CN)

(72) Inventors: Chenxi Zhu, Beijing (CN); Wei Ling, Beijing (CN); Bingchao Liu, Beijing (CN); Lingling Xiao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 468 days.

(21) Appl. No.: 17/633,516

(22) PCT Filed: Aug. 8, 2019

(86) PCT No.: PCT/CN2019/099728
§ 371 (c)(1),
(2) Date: Feb. 7, 2022

(87) PCT Pub. No.: WO2021/022537
PCT Pub. Date: Feb. 11, 2021

(65) Prior Publication Data
US 2022/0361209 A1 Nov. 10, 2022

(51) Int. Cl.
*H04W 72/1273* (2023.01)
*H04L 5/00* (2006.01)
*H04W 72/23* (2023.01)

(52) U.S. Cl.
CPC ....... *H04W 72/1273* (2013.01); *H04L 5/0007* (2013.01); *H04W 72/23* (2023.01)

(58) Field of Classification Search
CPC ............. H04W 72/1273; H04W 72/23; H04L 5/0007; H04L 5/0094; H04L 5/0053
See application file for complete search history.

(56) References Cited

U.S. PATENT DOCUMENTS 10,506,630 B2 * 12/2019 Park ....................... H04L 5/0092
11,166,247 B2 * 11/2021 Fu .......................... H04L 1/1819
(Continued)

FOREIGN PATENT DOCUMENTS

CN 109936427 A 6/2019
CN 110086579 A 8/2019
(Continued)

OTHER PUBLICATIONS

International Searching Authority, "Written Opinion of the International Searching Authority," PCT/CN2019/099728, Apr. 20, 2020, pp. 1-4.
(Continued)

*Primary Examiner* — Shean Tokuta
(74) *Attorney, Agent, or Firm* — Kunzler Needham & Hilton

(57) ABSTRACT
Apparatuses, methods, and systems are disclosed for indicating a slot offset corresponding to a downlink control channel. One method (500) includes transmitting (502) first information to a user equipment indicating to the user equipment to receive a downlink data channel a slot offset after a scheduling downlink control channel, wherein: the slot offset comprises at least one slot; the first information indicates a resource allocation entry of a resource allocation table; and each resource allocation entry of the resource allocation table indicates that the slot offset comprises at least one slot.

20 Claims, 6 Drawing Sheets

(56) References Cited

U.S. PATENT DOCUMENTS

| | | | | |
|---|---|---|---|---|
| 2019/0150007 A1* | 5/2019 | Frenne | | H04L 1/1896 |
| | | | | 370/252 |
| 2019/0297637 A1* | 9/2019 | Liou | | H04W 72/1273 |
| 2020/0029315 A1* | 1/2020 | Lin | | H04W 52/0216 |
| 2020/0120642 A1* | 4/2020 | Hwang | | H04L 5/005 |
| 2020/0374918 A1* | 11/2020 | Ang | | H04W 24/08 |
| 2020/0389874 A1* | 12/2020 | Lin | | H04L 5/0053 |
| 2022/0053553 A1* | 2/2022 | Li | | H04W 72/23 |
| 2022/0272731 A1* | 8/2022 | Cha | | H04W 76/28 |
| 2022/0361209 A1* | 11/2022 | Zhu | | H04W 72/1273 |
| 2023/0099197 A1* | 3/2023 | Kim | | H04L 5/00 |
| | | | | 370/329 |
| 2024/0205062 A1* | 6/2024 | Abdoli | | H04W 52/0261 |

FOREIGN PATENT DOCUMENTS

| | | | | | |
|---|---|---|---|---|---|
| CN | 116602026 | A | * | 8/2023 | H04W 72/0446 |
| EP | 3547781 | A1 | * | 10/2019 | H04W 72/0446 |
| EP | 3547782 | A1 | * | 10/2019 | H04W 72/23 |
| EP | 3772866 | A1 | * | 2/2021 | H04W 72/23 |
| EP | 4033795 | A1 | * | 7/2022 | H04W 72/23 |
| KR | 20230116052 | A | * | 8/2023 | H04W 72/0446 |
| WO | WO-2017184049 | A1 | * | 10/2017 | H04L 1/1896 |
| WO | WO-2018226054 | A1 | * | 12/2018 | H04L 5/00 |
| WO | WO-2019215889 | A1 | * | 11/2019 | H04L 5/0044 |
| WO | WO-2019216703 | A1 | * | 11/2019 | H04W 72/1268 |
| WO | WO-2020225048 | A1 | * | 11/2020 | H04W 72/23 |
| WO | WO-2020261350 | A1 | * | 12/2020 | H04W 72/23 |

OTHER PUBLICATIONS

Apple Inc., Cross Slot Scheduling for UE Power Saving, 3GPP TSG RAN WG1 #96bis, R1-1904986, Apr. 8-12, 2019, pp. 1-9, Xi'an, China.

Mediatek Inc., Enabling Cross-Slot Scheduling for NR, 3GPP TSG RAN WG1 Meeting #96-Bis, R1-1904488, Apr. 8-12, 2019, pp. 1-8, Xi'an, China.

* cited by examiner

200

300

500

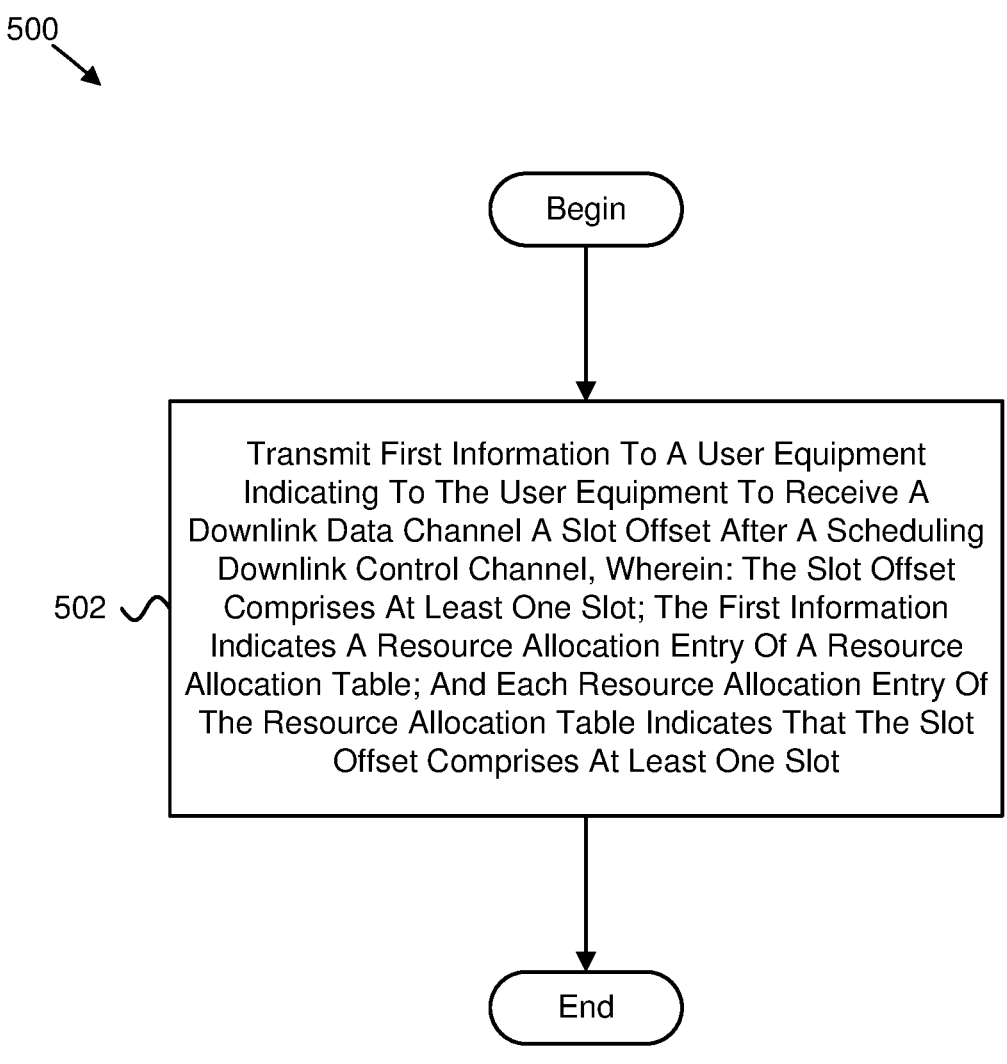

Begin

502

Transmit First Information To A User Equipment Indicating To The User Equipment To Receive A Downlink Data Channel A Slot Offset After A Scheduling Downlink Control Channel, Wherein: The Slot Offset Comprises At Least One Slot; The First Information Indicates A Resource Allocation Entry Of A Resource Allocation Table; And Each Resource Allocation Entry Of The Resource Allocation Table Indicates That The Slot Offset Comprises At Least One Slot End

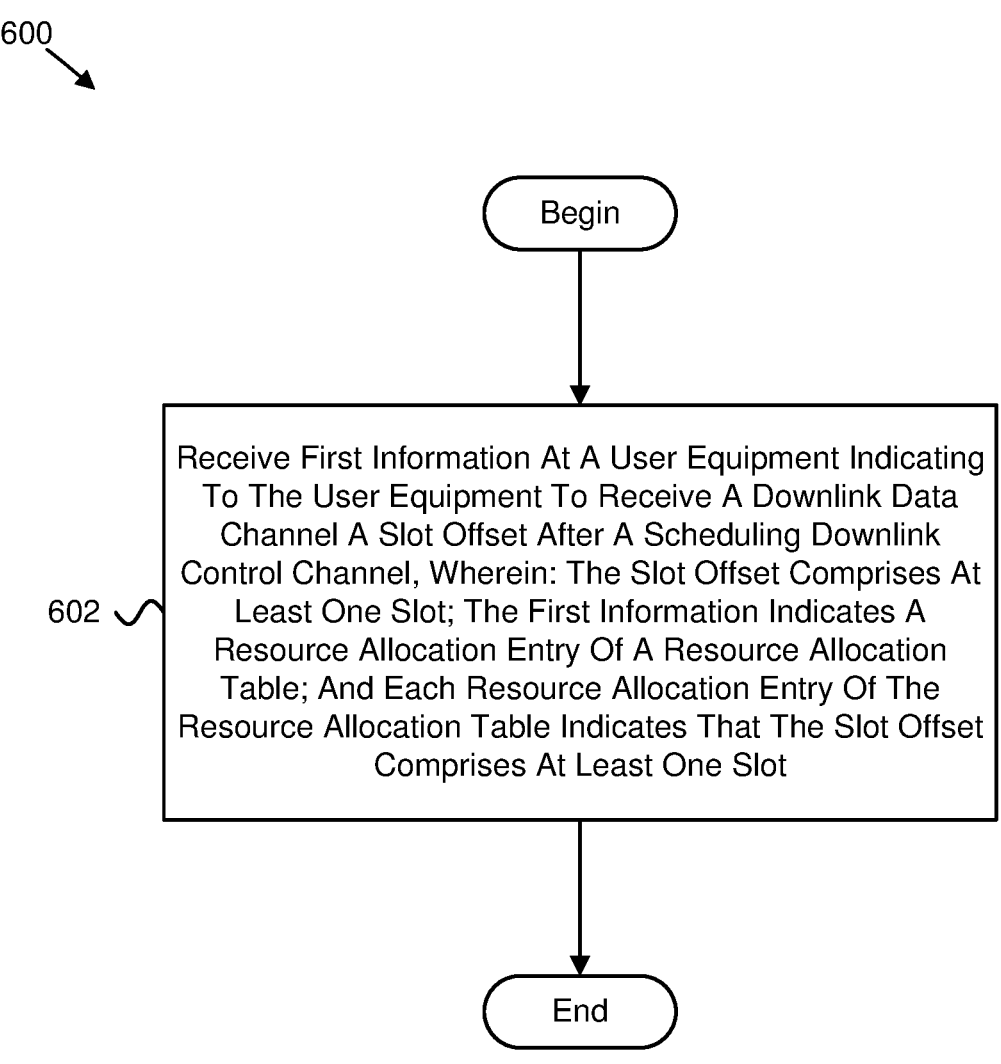

Begin

602

Receive First Information At A User Equipment Indicating To The User Equipment To Receive A Downlink Data Channel A Slot Offset After A Scheduling Downlink Control Channel, Wherein: The Slot Offset Comprises At Least One Slot; The First Information Indicates A Resource Allocation Entry Of A Resource Allocation Table; And Each Resource Allocation Entry Of The Resource Allocation Table Indicates That The Slot Offset Comprises At Least One Slot End

FIG. 6

INDICATING A SLOT OFFSET CORRESPONDING TO A DOWNLINK CONTROL CHANNEL

FIELD

The subject matter disclosed herein relates generally to wireless communications and more particularly relates to indicating a slot offset corresponding to a downlink control channel.

BACKGROUND

The following abbreviations are herewith defined, at least some of which are referred to within the following description: Third Generation Partnership Project ("3GPP"), 5G QoS Indicator ("5QI"), Acknowledge Mode ("AM"), Backhaul ("BH"), Broadcast Multicast ("BM"), Buffer Occupancy ("BO"), Base Station ("BS"), Buffer Status Report ("BSR"), Bandwidth ("BW"), Bandwidth Part ("BWP"), Component Carrier ("CC"), Code Division Multiplexing ("CDM"), Control Element ("CE"), Coordinated Multipoint ("CoMP"), Categories of Requirements ("CoR"), Control Resource Set ("CORESET"), Cyclic Prefix ("CP"), Cyclic Prefix OFDM ("CP-OFDM"), CSI-RS Resource Indicator ("CRI"), Cell RNTI ("C-RNTI"), Channel State Information ("CSI"), CSI IM ("CSI-IM"), CSI RS ("CSI-RS"), Channel Quality Indicator ("CQI"), Central Unit ("CU"), Codeword ("CW"), Downlink Assignment Index ("DAI"), Downlink Control Information ("DCI"), Downlink ("DL"), Discrete Fourier Transform Spread OFDM ("DFT-s-OFDM"), Demodulation Reference Signal ("DMRS" or "DM-RS"), Data Radio Bearer ("DRB"), Dedicated Short-Range Communications ("DSRC"), Distributed Unit ("DU"), Enhanced Mobile Broadband ("eMBB"), Evolved Node B ("eNB"), Enhanced Subscriber Identification Module ("eSIM"), Enhanced ("E"), Frequency Division Duplex ("FDD"), Frequency Division Multiple Access ("FDMA"), Frequency Range ("FR"), 450 MHz-6000 MHz ("FR1"), 24250 MHz-52600 MHz ("FR2"), Hybrid Automatic Repeat Request ("HARQ"), High-Definition Multimedia Interface ("HDMI"), Integrated Access Backhaul ("IAB"), Identity or Identifier or Identification ("ID"), Interference Measurement ("IM"), International Mobile Subscriber Identity ("IMSI"), Internet-of-Things ("IoT"), Internet Protocol ("IP"), Joint Transmission ("JT"), Level 1 ("L1"), L1 SINR ("L1-SINR"), Logical Channel ("LCH"), Logical Channel Group ("LCG"), Logical Channel ID ("LCID"), Logical Channel Prioritization ("LCP"), Long Term Evolution ("LTE"), Levels of Automation ("LoA"), Medium Access Control ("MAC"), Modulation Coding Scheme ("MCS"), Multiple Input Multiple Output ("MIMO"), Mobile-Termination ("MT"), Machine Type Communication ("MTC"), Multi-User ("MU"), Multi-User MIMO ("MU-MIMO"), Negative-Acknowledgment ("NACK") or ("NAK"), Next Generation ("NG"), Next Generation Node B ("gNB"), New Radio ("NR"), Non-Zero Power ("NZP"), NZP CSI-RS ("NZP-CSI-RS"), Orthogonal Frequency Division Multiplexing ("OFDM"), Peak-to-Average Power Ratio ("PAPR"), Physical Broadcast Channel ("PBCH"), Physical Downlink Control Channel ("PDCCH"), Physical Downlink Shared Channel ("PDSCH"), Policy Control Function ("PCF"), Packet Data Convergence Protocol ("PDCP"), Packet Data Network ("PDN"), Protocol Data Unit ("PDU"), Public Land Mobile Network ("PLMN"), Precoding Matrix Indicator ("PMI"), ProSe Per Packet Priority ("PPPP"), ProSe Per Packet Reliability ("PPPR"), Physical Resource Block ("PRB"), Packet Switched ("PS"), Physical Sidelink Control Channel ("PSCCH"), Physical Sidelink Shared Channel ("PSSCH"), Phase Tracking RS ("PTRS" or "PT-RS"), Physical Uplink Shared Channel ("PUSCH"), Quasi Co-Located ("QCL"), Quality of Service ("QoS"), Random Access Channel ("RACH"), Radio Access Network ("RAN"), Radio Access Technology ("RAT"), Resource Element ("RE"), Radio Frequency ("RF"), Rank Indicator ("RI"), Radio Link Control ("RLC"), Radio Link Failure ("RLF"), Radio Network Temporary Identifier ("RNTI"), Resource Pool ("RP"), Radio Resource Control ("RRC"), Reference Signal ("RS"), Reference Signal Received Power ("RSRP"), Reference Signal Received Quality ("RSRQ"), Receive ("RX"), Single Carrier Frequency Domain Spread Spectrum ("SC-FDSS"), Secondary Cell ("SCell"), Sub Carrier Spacing ("SCS"), Service Data Unit ("SDU"), Subscriber Identity Module ("SIM"), Signal-to-Interference Ratio ("SINR"), Sidelink ("SL"), Sequence Number ("SN"), Scheduling Request ("SR"), SRS Resource Indicator ("SRI"), Sounding Reference Signal ("SRS"), Synchronization Signal ("SS"), SS/PBCH Block ("SSB"), Transmission Control Information ("TCI"), Time Division Duplex ("TDD"), Temporary Mobile Subscriber Identity ("TMSI"), Transmitted Precoding Matrix Indicator ("TPMI"), Transmission Reception Point ("TRP"), Transmit ("TX"), User Entity/Equipment (Mobile Terminal) ("UE"), Universal Integrated Circuit Card ("UICC"), Uplink ("UL"), Unacknowledged Mode ("UM"), Universal Mobile Telecommunications System ("UMTS"), User Plane ("UP"), Universal Subscriber Identity Module ("USIM"), Universal Terrestrial Radio Access Network ("UTRAN"), Vehicle to Everything ("V2X"), Voice Over IP ("VoIP"), Visited Public Land Mobile Network ("VPLMN"), Vehicle RNTI ("V-RNTI"), Worldwide Interoperability for Microwave Access ("WiMAX"), Zero Power ("ZP"), and ZP CSI-RS ("ZP-CSI-RS"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, PDSCH may be transmitted after PDCCH. In such networks, a UE may delay decoding the PDSCH because it is unknown if the PDSCH is in a same slot as the PDCCH.

BRIEF SUMMARY

Methods for indicating a slot offset corresponding to a downlink control channel are disclosed. Apparatuses and systems also perform the functions of the apparatus. In one embodiment, the method includes transmitting first information to a user equipment indicating to the user equipment to receive a downlink data channel a slot offset after a scheduling downlink control channel, wherein: the slot offset comprises at least one slot; the first information indicates a resource allocation entry of a resource allocation table; and each resource allocation entry of the resource allocation table indicates that the slot offset comprises at least one slot.

An apparatus for indicating a slot offset corresponding to a downlink control channel, in one embodiment, includes a transmitter that transmits first information to a user equipment indicating to the user equipment to receive a downlink data channel a slot offset after a scheduling downlink control channel, wherein: the slot offset comprises at least one slot; the first information indicates a resource allocation entry of a resource allocation table; and each resource allocation entry of the resource allocation table indicates that the slot offset comprises at least one slot.

In one embodiment, a method for indicating a slot offset corresponding to a downlink control channel includes receiving first information at a user equipment indicating to the user equipment to receive a downlink data channel a slot offset after a scheduling downlink control channel, wherein: the slot offset comprises at least one slot; the first information indicates a resource allocation entry of a resource allocation table; and each resource allocation entry of the resource allocation table indicates that the slot offset comprises at least one slot.

An apparatus for indicating a slot offset corresponding to a downlink control channel, in one embodiment, includes a receiver that receives first information indicating to the apparatus to receive a downlink data channel a slot offset after a scheduling downlink control channel, wherein: the slot offset comprises at least one slot; the first information indicates a resource allocation entry of a resource allocation table; and each resource allocation entry of the resource allocation table indicates that the slot offset comprises at least one slot.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 5 is a schematic flow chart diagram illustrating one embodiment of a method for indicating a slot offset corresponding to a downlink control channel; and FIG. 6 is a schematic flow chart diagram illustrating another embodiment of a method for indicating a slot offset corresponding to a downlink control channel.

DETAILED DESCRIPTION

Figure 1:
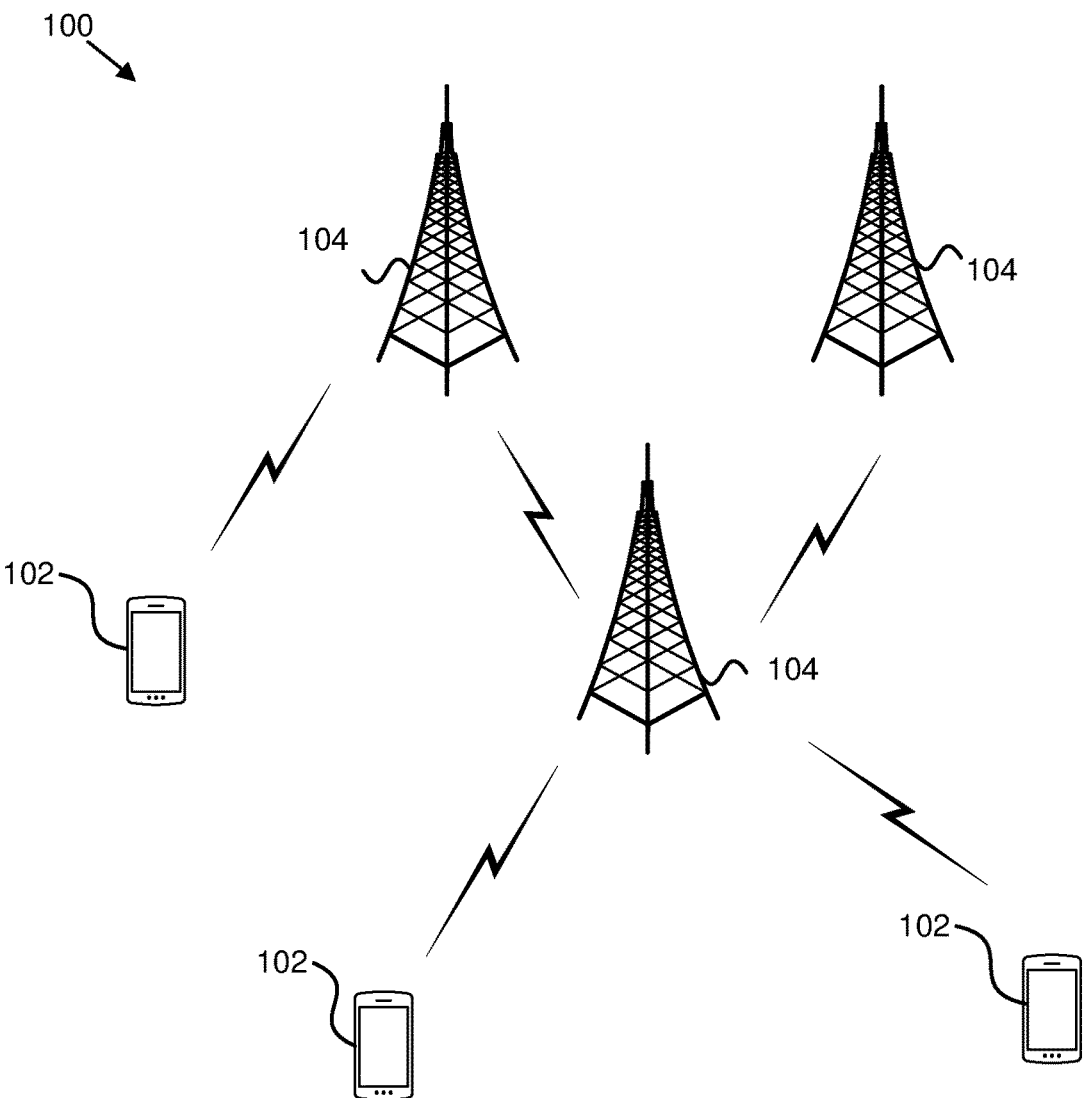
FIG. 1 is a schematic block diagram illustrating one embodiment of a wireless communication system for indicating a slot offset corresponding to a downlink control channel.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for indicating a slot offset corresponding to a downlink control channel. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals and/or the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a RAN, a relay node, a device, a network device, an IAB node, a donor IAB node, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 5G or NG (Next Generation) standard of the 3GPP protocol, wherein the network unit 104 transmits using NG RAN technology. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a network unit 104 may transmit first information to a user equipment indicating to the user equipment to receive a downlink data channel a slot offset after a scheduling downlink control channel, wherein: the slot offset comprises at least one slot; the first information indicates a resource allocation entry of a resource allocation table; and each resource allocation entry of the resource allocation table indicates that the slot offset comprises at least one slot. Accordingly, a network unit 104 may be used for indicating a slot offset corresponding to a downlink control channel.

In some embodiments, a remote unit 102 may receive first information indicating to the apparatus to receive a downlink data channel a slot offset after a scheduling downlink control channel, wherein: the slot offset comprises at least one slot; the first information indicates a resource allocation entry of a resource allocation table; and each resource allocation entry of the resource allocation table indicates that the slot offset comprises at least one slot. Accordingly, a remote unit 102 may be used for indicating a slot offset corresponding to a downlink control channel.

Figure 2:
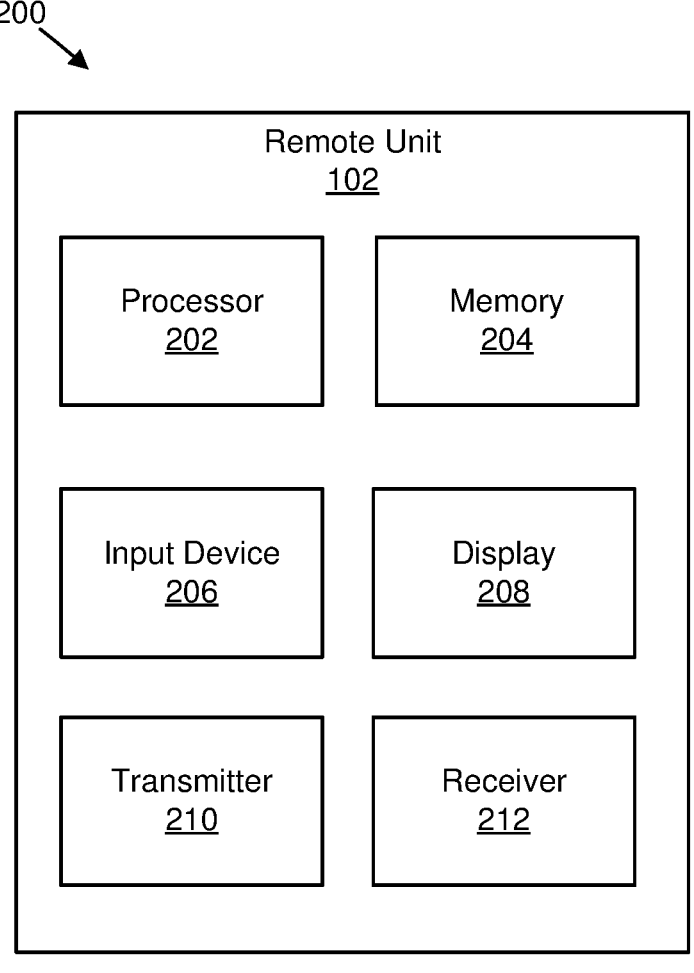
FIG. 2 is a schematic block diagram illustrating one embodiment of an apparatus that may be used for indicating a slot offset corresponding to a downlink control channel.

FIG. 2 depicts one embodiment of an apparatus 200 that may be used for indicating a slot offset corresponding to a downlink control channel. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104. In one embodiment, the receiver 212 receives first information indicating to the apparatus to receive a downlink data channel a slot offset after a scheduling downlink control channel, wherein: the slot offset comprises at least one slot; the first information indicates a resource allocation entry of a resource allocation table; and each resource allocation entry of the resource allocation table indicates that the slot offset comprises at least one slot.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
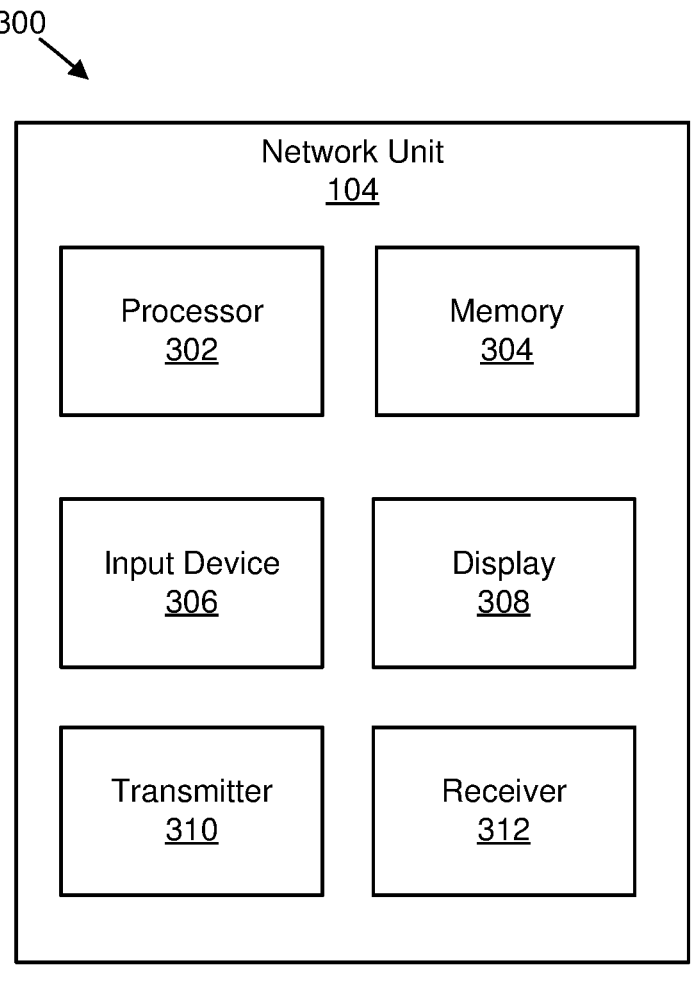
FIG. 3 is a schematic block diagram illustrating one embodiment of an apparatus that may be used for indicating a slot offset corresponding to a downlink control channel.

FIG. 3 depicts one embodiment of an apparatus 300 that may be used for indicating a slot offset corresponding to a downlink control channel. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310 transmits first information to a user equipment indicating to the user equipment to receive a downlink data channel a slot offset after a scheduling downlink control channel, wherein: the slot offset comprises at least one slot; the first information indicates a resource allocation entry of a resource allocation table; and each resource allocation entry of the resource allocation table indicates that the slot offset comprises at least one slot. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In some embodiments, NR physical layer channels may be used for configurations that operate under 52.6 GHz; while, in other embodiments, NR physical layer channels may be used for configurations that operate at or above 52.6 GHz. As may be appreciated, high frequency configurations may have as higher phase noise, a larger propagation loss, and/or a lower power amplifier efficiency compared to low frequency configurations. Moreover, frequency ranges above 52.6 GHz may contain larger spectrum allocations and larger bandwidths that are not available for frequencies lower than 52.6 GHz. Furthermore, frequency ranges above 52.6 GHz may support V2X, IAB, NR licensed, NR unlicensed, fixed wireless access, wireless HDMI, industrial automation, IoT, and/or non-terrestrial operations.

As may be appreciated, radio propagation channel, RF components, and antenna structures for higher frequency may be significantly different than radio propagation channel, RF components, and antenna structures for lower frequencies.

In various configurations, a system may be designed for frequency up to 52.6 GHz. In such embodiments, CP-OFDM may be used in DL, CP-OFDM may be used for transmission of ranks 1-4 in UL, and DFT-s-OFDM may be used only for transmission of rank 1 in UL. As may be appreciated, a transmission rank K may mean that K different data streams may be transmitted at the same time using the same time and frequency resource. Moreover, in such embodiments, the DL and the UL may share the same numerology with subcarrier spacing of 15*2$^u$ kHz, where u may be 0, 1, 2, 3, or 4 as shown in Table 1.

TABLE 1

| NR Numerology | | | | | |
|---|---|---|---|---|---|
| | Parameter/Numerology (u) | | | | |
| | 0 | 1 | 2 | 3 | 4 |
| Subcarrier Spacing (kHz) | 15 | 30 | 60 | 120 | 240 |
| OFDM Symbol Duration (us) | 66.67 | 33.33 | 16.67 | 8.33 | 4.17 |
| Cyclic Prefix Duration (us) | 4.69 | 2.34 | 1.17 | 0.57 | 0.29 |
| OFDM Symbol including CP (us) | 71.35 | 35.68 | 17.84 | 8.92 | 4.46 |

As may be appreciated, even for a subcarrier spacing of 240 kHz, a CP duration of 0.29 us may be too long for a high frequency channel (e.g., at or above 52.6 GHz). In certain embodiments, at 60 GHz, OFDM subcarrier spacing may be 5.15625 MHz and guard interval or CP may range from 18.2 ns to 72.7 ns. In some embodiments, for frequencies greater than or equal to 52.6 GHz, the SCS may be increased and CP length decreased compared to frequencies less than 52.6 GHz. This may result in an OFDM symbol length decrease and slot length decrease compared to frequencies less than 52.6 GHz. It should be noted that a decreased OFDM symbol length coupled with a wide bandwidth at higher frequencies may increase power consumption of a UE compared to frequencies less than 52.6 GHz. Described herein are various methods for scheduling and/or signaling for frequencies greater than or equal to 52.6 GHz.

In various embodiments, a time domain resource allocation of PDSCH may be defined by a triplet $(K_0, S, L)$, where a $K_0$ value indicates a scheduled PDSCH is in a $K_0$-th slot after a scheduling DCI, S indicates a position of the first symbol in the PDSCH, and L indicates a duration of PDSCH in symbols. In such embodiments, if a UE is scheduled to receive PDSCH by a DCI, a Time domain resource assignment field value m of the DCI may provide a row index m+1 to an allocation table. In some embodiments, a determination of the allocation table (e.g., resource allocation table) may be defined in sub-clause 5.1.2.1.1 of TS38.214. In certain embodiments, an indexed row defines a slot offset $K_0$, a start and length indicator SLIV, a start symbol S, an allocation length L, and/or a PDSCH mapping type to be assumed in the PDSCH reception.

In some embodiments, given parameter values of an indexed row, a slot allocated for the PDSCH may be $$\left\lfloor n \cdot \frac{2^{\mu_{PDSCH}}}{2^{\mu_{PDCCH}}} \right\rfloor + K_0,$$

where n is the slot with the scheduling DCI, $K_0$ is based on a numerology of PDSCH, $\mu_{PDSCH}$ and $\mu_{PDCCH}$ are subcarrier spacing configurations for PDSCH and PDCCH, respectively. In such embodiments, a starting symbol S relative to a start of the slot, and a number of consecutive symbols L counting from the symbol S allocated for the PDSCH are determined from a start and length indicator SLIV. If (L−1) ≤7, then SLIV=14·(L−1)+S; else SLIV=14·(14−L+1)+(14−1−S), where 0<L≤14−S, and a PDSCH mapping type is set to Type A or Type B, such as defined in sub-clause 7.4.1.1.2 of TS 38.211.

In certain embodiments, a UE may consider S and L combinations defined in Table 2 as valid PDSCH allocations.

TABLE 2

| | Valid S and L Combinations | | | | | |
|---|---|---|---|---|---|---|
| PDSCH | Normal Cyclic Prefix | | | Extended Cyclic Prefix | | |
| Mapping Type | S | L | S + L | S | L | S + L |
| Type A | {0, 1, 2, 3} (Note 1) | {3, . . . , 14} | {3, . . . , 14} | {0, 1, 2, 3} (Note 1) | {3, . . . , 12} | {3, . . . , 12} |
| Type B | {0, . . . , 12} | {2, 4, 7} | {2, . . . , 14} | {0, . . . , 10} | {2, 4, 6} | {2, . . . , 12} |

(Note 1):
S = 3 is applicable only if dmrs-TypeA-Posiition = 3

In various embodiments, depending on a type of an RNTI and whether pdsch-TimeDomainAllocationList is provided in pdsch-ConfigCommon in an RRC configuration, a time domain resource allocation may be determined by either pdsch-TimeDomainAllocationList or a 4 bit time domain resource assignment field in DCI. Table 3 defines one embodiment of where a UE gets its time domain resource allocation. Furthermore, Table 3 defines one embodiment of which PDSCH time domain resource allocation configuration to apply. In various embodiments, either a default PDSCH time domain allocation A, B, or C according to tables 4, 5, 6, and 7 may be applied, or a higher layer configured pdsch-TimeDomainAllocationList in either pdsch-ConfigCommon or pdsch-Config may be applied.

TABLE 3

| | | | PSSCH Time Domain Resource Allocation | | |
|---|---|---|---|---|---|
| RNTI | PDCCH Search Space | SS/PBCH Block and CORESET Multiplexing Pattern | pdsch-ConfigCommon Includes pdsch-TimeDomainAl-locationList | pdsch-Config includes pdsch-TimeDomainAl-locationList | PDSCH Time Domain Resource Allocation to Apply |
| SI-RNTI | Type0 common | 1 | — | — | Default A for normal CP |
| | | 2 | — | — | Default B |
| | | 3 | — | — | Default C |
| SI-RNTI | Type0A common | 1 | No | — | Default A |
| | | 2 | No | — | Default B |
| | | 3 | No | — | Default C |
| | | 1, 2, 3 | Yes | — | pdsch-TimeDomainAl-locationList provided in pdsch-ConfigCommon |
| RA-RNTI, TC-RNTI | Type1 common | 1, 2, 3 | No | — | Default A |
| | | 1, 2, 3 | Yes | — | pdsch-TimeDomainAl-locationList provided in pdsch-ConfigCommon |
| P-RNTI | Type2 common | 1 | No | — | Default A |
| | | 2 | No | — | Default B |
| | | 3 | No | — | Default C |
| | | 1, 2, 3 | Yes | — | pdsch-TimeDomainAl-locationList provided in pdsch-ConfigCommon |
| C-RNTI, MCS-C-RNTI, CS-RNTI | Any common search space associated with CORESET 0 | 1, 2, 3 | No | — | Default A |
| | | 1, 2, 3 | Yes | — | pdsch-TimeDomainAl-locationList provided in pdsch-ConfiigCommon |
| C-RNTI, MCS-C-RNTI, CS-RNTI | Any common search space not associated with CORESET 0 | 1, 2, 3 | No | No | Default A |
| | | 1, 2, 3 | Yes | No | pdsch-TimeDomainAl-locationList provided in pdsch-ConfiigCommon |
| | UE specific search space | 1, 2, 3 | No/Yes | Yes | pdsch-TimeDomainAl-locationList provided in pdsch-Config |

In some embodiments, if a time domain resource alloca-
tion is given by a PDSCH-TimeDomainResourceAlloca-
tionList, the parameters ($K_0$, S, L) may be configured in
RRC.

As may be appreciated, an IE PDSCH-TimeDomainRe-
sourceAllocation may be used to configure a time domain
relation between PDCCH and PDSCH. In such embodi-
ments, the PDSCH-TimeDomainResourceAllocationList
may contain one or more PDSCH-TimeDomainResourceAl-
locations. In some embodiments, a network may indicate in
a DL assignment which of configured time domain alloca-
tions a UE should apply for that DL assignment. In various
embodiments, a UE determines a bit width of a DCI field
based on a number of entries in a PDSCH-TimeDomainRe-
sourceAllocationList. In such embodiments, a value 0 in the
DCI field may refer to a first element in the list, a value 1 in
the DCI field may refer to a second element in the list, and
so forth. Each item in the list may specify a parameter $K_0$,
a mapping type, a start symbol, and/or a length.

In some embodiments, a PDSCH-TimeDomainRe-
sourceAllocationList information element may include the
following information: —55 ASN1START—TAG-PDSCH-
TIMEDOMAINRESOURCEALLOCATIONLIST-START
PDSCH-TimeDomainResourceAllocationList::=SE-
QUENCE (SIZE(1 . . . maxNrofDL-Allocations)) OF
PDSCH-TimeDomainResourceAllocation PD SCH-Time-
DomainResourceAllocation::=SEQUENCE {k0 INTE-
GER(0 . . . 32) OPTIONAL, —Need S mappingType
ENUMERATED {typeA, typeB}, startSymbolAndLength
INTEGER (0 . . . 127) TAG-PDSCH-TIMEDOMAINRE-
SOURCEALLOCATIONLIST-STOP—ASN1STOP}.

In certain embodiments, if a time domain resource allo-
cation is signaled through DCI 1_0 or 1_1, the time domain
resource allocation may be indicated by a dedicated 4 bit
field that points to an entry in a table depending on a DMRS
position and/or a PDSCH mapping type.

In various embodiments, for a time domain resource
assignment, 4 bits for a 4 bit field may be defined in
Subclause 5.1.2.1 of TS 38.214.

TABLE 4

Default PDSCH Time Domain Resource
Allocation A for Normal CP

| Row Index | dmrs-TypeA-Position | PDSCH Mapping Type | $K_0$ | S | L |
|---|---|---|---|---|---|
| 1 | 2 | Type A | 0 | 2 | 12 |
|  | 3 | Type A | 0 | 3 | 11 |
| 2 | 2 | Type A | 0 | 2 | 10 |
|  | 3 | Type A | 0 | 3 | 9 |
| 3 | 2 | Type A | 0 | 2 | 9 |
|  | 3 | Type A | 0 | 3 | 8 |
| 4 | 2 | Type A | 0 | 2 | 7 |
|  | 3 | Type A | 0 | 3 | 6 |
| 5 | 2 | Type A | 0 | 2 | 5 |
|  | 3 | Type A | 0 | 3 | 4 |
| 6 | 2 | Type B | 0 | 9 | 4 |
|  | 3 | Type B | 0 | 10 | 4 |
| 7 | 2 | Type B | 0 | 4 | 4 |
|  | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

TABLE 5

Default PDSCH Time Domain Resource
Allocation A for Extended CP

| Row Index | dmrs-TypeA-Position | PDSCH Mapping Type | $K_0$ | S | L |
|---|---|---|---|---|---|
| 1 | 2 | Type A | 0 | 2 | 6 |
|  | 3 | Type A | 0 | 3 | 5 |
| 2 | 2 | Type A | 0 | 2 | 10 |
|  | 3 | Type A | 0 | 3 | 9 |
| 3 | 2 | Type A | 0 | 2 | 9 |
|  | 3 | Type A | 0 | 3 | 8 |
| 4 | 2 | Type A | 0 | 2 | 7 |
|  | 3 | Type A | 0 | 3 | 6 |
| 5 | 2 | Type A | 0 | 2 | 5 |
|  | 3 | Type A | 0 | 3 | 4 |
| 6 | 2 | Type B | 0 | 6 | 4 |
|  | 3 | Type B | 0 | 8 | 2 |
| 7 | 2 | Type B | 0 | 4 | 4 |
|  | 3 | Type B | 0 | 6 | 4 |
| 8 | 2, 3 | Type B | 0 | 5 | 6 |
| 9 | 2, 3 | Type B | 0 | 5 | 2 |
| 10 | 2, 3 | Type B | 0 | 9 | 2 |
| 11 | 2, 3 | Type B | 0 | 10 | 2 |
| 12 | 2, 3 | Type A | 0 | 1 | 11 |
| 13 | 2, 3 | Type A | 0 | 1 | 6 |
| 14 | 2, 3 | Type A | 0 | 2 | 4 |
| 15 | 2, 3 | Type B | 0 | 4 | 6 |
| 16 | 2, 3 | Type B | 0 | 8 | 4 |

TABLE 6

Default PDSCH Time Domain Resource Allocation B

| Row Index | dmrs-TypeA-Position | PDSCH Mapping Type | $K_0$ | S | L |
|---|---|---|---|---|---|
| 1 | 2, 3 | Type B | 0 | 2 | 2 |
| 2 | 2, 3 | Type B | 0 | 4 | 2 |
| 3 | 2, 3 | Type B | 0 | 6 | 2 |
| 4 | 2, 3 | Type B | 0 | 8 | 2 |
| 5 | 2, 3 | Type B | 0 | 10 | 2 |
| 6 | 2, 3 | Type B | 1 | 2 | 2 |
| 7 | 2, 3 | Type B | 1 | 4 | 2 |
| 8 | 2, 3 | Type B | 0 | 2 | 4 |
| 9 | 2, 3 | Type B | 0 | 4 | 4 |
| 10 | 2, 3 | Type B | 0 | 6 | 4 |
| 11 | 2, 3 | Type B | 0 | 8 | 4 |
| 12 (Note 1) | 2, 3 | Type B | 0 | 10 | 4 |
| 13 (Note 1) | 2, 3 | Type B | 0 | 2 | 7 |
| 14 (Note 1) | 2 | Type A | 0 | 2 | 12 |
|  | 3 | Type A | 0 | 3 | 11 |
| 15 | 2, 3 | Type B | 1 | 2 | 4 |
| 16 | | Reserved | | | |

(Note 1):
If the PDSCH was scheduled with SI-RNTI in PDCCH Type0 common search space, the
UE may assume that this PDSCH resource allocation is not applied

TABLE 7

Default PDSCH Time Domain Resource Allocation C

| Row Index | dmrs-TypeA-Position | PDSCH Mapping Type | $K_0$ | S | L |
|---|---|---|---|---|---|
| 1 (Note 1) | 2, 3 | Type B | 0 | 2 | 2 |
| 2 | 2, 3 | Type B | 0 | 4 | 2 |
| 3 | 2, 3 | Type B | 0 | 6 | 2 |
| 4 | 2, 3 | Type B | 0 | 8 | 2 |
| 5 | 2, 3 | Type B | 0 | 10 | 2 |
| 6 | | Reserved | | | |
| 7 | | Reserved | | | |

TABLE 7-continued

| | | Default PDSCH Time Domain Resource Allocation C | | | |
|---|---|---|---|---|---|
| Row Index | dmrs-TypeA-Position | PDSCH Mapping Type | $K_0$ | S | L |
| 8 | 2, 3 | Type B | 0 | 2 | 4 |
| 9 | 2, 3 | Type B | 0 | 4 | 4 |
| 10 | 2, 3 | Type B | 0 | 6 | 4 |
| 11 | 2, 3 | Type B | 0 | 8 | 4 |
| 12 | 2, 3 | Type B | 0 | 10 | 4 |
| 13 (Note 1) | 2, 3 | Type B | 0 | 2 | 7 |
| 14 (Note 1) | 2 | Type A | 0 | 2 | 12 |
| | 3 | Type A | 0 | 3 | 11 |
| 15 (Note 1) | 2, 3 | Type A | 0 | 0 | 6 |
| 16 (Note 1) | 2, 3 | Type A | 0 | 2 | 6 |

(Note 1):
The UE may assume that this PDSCH resource allocation is not used, if the PDSCH was scheduled with SI-RNTI in PDCCH Type0 common search space In some embodiments, if $K_0=0$, a PDSCH may be in a same slot as scheduling DCI.

In certain embodiments, if time domain resource allocation is done through DCI, because it may take time for a UE to decode PDCCH, and because $K_0$ may be 0, the UE may buffer an entire BWP in all the symbols in a same slot to not miss a potential PDSCH in the same slot destined for itself.

In various embodiments with a high bandwidth (e.g., as high as 5 GHz, greater than 5 GHz), an enormous amount of energy, processing power, and/or memory may be used to receive and store information in all REs of an entire bandwidth. Described herein are various embodiments that may be used to reduce power consumption and memory for such embodiments.

In some embodiments, such as for an NR system that operates at or above 52.6 GHz, CP-OFDM or a single carrier waveform (e.g., DFT-s-OFDM or a variation such as SC-FDSS) may be used for DL. In such embodiments, for UL, DFT-s-OFDM or a variation may be preferred for use over CP-ODFM, even for rank above 1. In such embodiments, multi-path delay may significantly decrease at these high frequencies as compared to operations below 52.6 GHz (e.g., because of negligible diffraction, reduced reflection, narrowing beam width, increased frequency offset, and/or increased phase noise). Accordingly, in certain embodiments, an NR system that operates at or above 52.6 GHz may have a larger subcarrier spacing than systems that operate below 52.6 GHz. In such embodiments, the subcarrier spacing may be 480 kHz, 960 kHz, 1.92 MHz, or 3.84 MHz, for example. Furthermore, in such embodiments, a duration of a slot may be 1/32 ms, 1/64 ms, 1/128 ms, or 1/256 ms, for example. Thus, a delay of a slot may be relatively insignificant. In certain embodiments, having PDSCH transmitted one or more slots after PDCCH may enable a UE to decode DCI before receiving the PDSCH. In various embodiments, a UE only needs to receive and process PDSCH resources that a gNB sends to the to UE for the UE to use. By delaying transmission of PDSCH and/or limiting whether a UE receives PDSCH resources, a significant amount of UE power may be saved as compared to embodiments that do not delay PDSCH and/or limit wither a UE receives PDSCH resources. Furthermore, by delaying transmission of PDSCH, a UE may decode PDCCH before the PDSCH arrives at the UE.

In some embodiments, a delay between PDCCH and PDSCH may be given by a parameter $K_0$. In such embodiments, to enforce the delay between PDCCH and PDSCH, $K_0$ may be greater than or equal to 1. In certain embodiments, because a duration of a symbol or a slot may be shorter with large subcarrier spacing than with smaller subcarrier spacing, a UE may not be able to decode PDCCH within the same slot (e.g., for SCS=3.84 MHz). As may be appreciated, how quickly a UE completes PDCCH decoding may depend on a numerology if a decoding time is measured in a slot. In various embodiments, $N_0$ (e.g., $N_0 \geq 1$) may define a number of slots between PDCCH and its scheduled PDSCH required for a UE to complete decoding of DCI before the PDSCH. In certain embodiments, a requirement for a UE to always receive PDSCH after it has decoded PDCCH may require $K_0 \geq N_0$. In such embodiments, the parameter $N_0$ may be defined in a specification for different numerologies, or may be part of a UE capability and require the UE to signal this information to a gNB.

Figure 4:
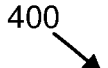
FIG. 4 is a schematic block diagram illustrating one embodiment of communications including a UE capability.
Figure 4:
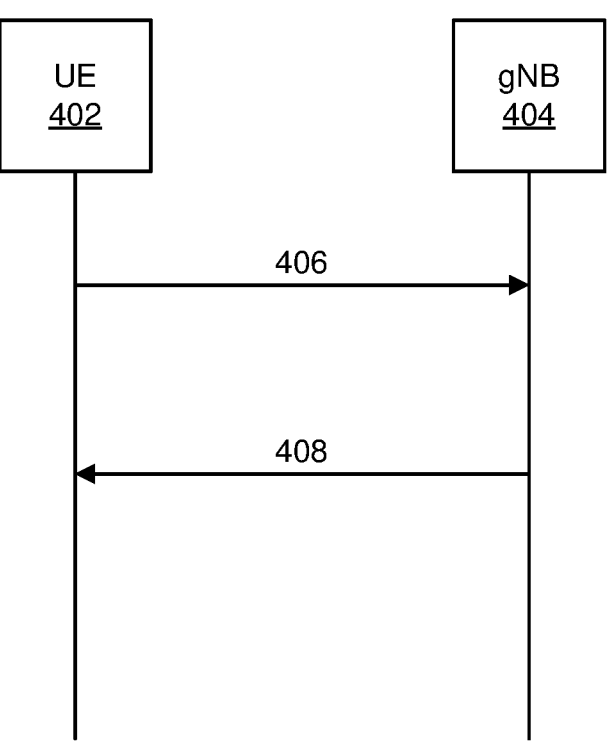

FIG. 4 is a schematic block diagram illustrating one embodiment of communications 400 including a UE capability. The communications 400 include communications between a UE 402 (e.g., a remote unit 102) and a gNB 404 (e.g., a network unit 104). As may be appreciated, each communication of the communications 400 may include one or more messages.

In certain embodiments, a first communication 406 is transmitted from the UE 402 to the gNB 404. The first communication 406 may include a UE capability. Moreover, the UE capability may include the parameter $N_0$. In some embodiments, a second communication 408 transmitted from the gNB 404 to the UE 402 has transmission timing that is based on the parameter $N_0$ received from the UE 402. For example, the second communication 408 may include PDCCH followed by PDSCH that is delayed from the PDCCH based on the parameter $N_0$. In certain embodiments, before the gNB 404 receives the UE capability that includes the parameter $N_0$, the gNB 404 may use a default parameter that all UEs may support (e.g., may be required to support). The default parameter may be dependent on an OFDM numerology that may be known to the UE 402 (e.g., upon detection of a synchronization and/or broadcast signal).

In some embodiments, a default time value may be defined in a specification for a gNB to make a transmission to a UE before the UE enters an RRC_CONNECTED mode. In certain embodiments, with a definition of $N_0$, a time resource allocation indicated in DCI 1_0 or 1_1 and a time resource allocation in RRC may be constrained such that $K_0 \geq N_0$.

In various embodiments, default PDSCH time domain resource allocation tables (e.g., Tables 4, 5, 6, 7) may be defined for configurations that operate at greater than or equal to 52.6 GHz (e.g., with values for $K_0$ in which $K_0 \geq 1$ for all entries of $K_0$). As may be appreciated, different tables may be used for different numerologies.

In some embodiments, whenever PDSCH-TimeDomainResourceAllocation is included in PDSCH-Config or PDSCH-ConfigCommon, a $K_0 \geq 1$ may be in an RRC message. As may be appreciated, because PDSCH-TimeDomainResourceAllocation may be configured by a gNB, a UE may not be expected to receive an RRC configuration with $K_0 < N_0$. A starting position S and length L of a scheduled PDSCH in its scheduled slot may be the same for embodiments that operate at greater than or equal to 52.6 GHz as for embodiments that operate at less than 52.6 GHz.

In certain embodiments, for systems that operate at greater than or equal to 52.6 GHz, there may be no change to a DCI format 1_0 or 1_1, or to an RRC parameter PDSCH-TimeDomainResourceAllocation. Moreover, the parameters ($K_0$, S, L) may be given by RRC parameter PDSCH-TimeDomainResourceAllocation by DCI format 1_0 or 1_1. In various embodiments, a timing relationship between PDCCH and its scheduled PDSCH may be interpreted using a parameter $K_0'=K_0+N_0$, and a slot allocated for PDSCH may be $$\left\lfloor n \cdot \frac{2^{\mu PDSCH}}{2^{\mu PDCCH}} \right\rfloor + K_0',$$

where n is the slot with scheduling DCI, $K_0$ is based on a numerology of the PDSCH, and $\mu_{PDSCH}$ and $\mu_{PDCCH}$ are the subcarrier spacing configurations for PDSCH and PDCCH, respectively. In such embodiments, $N_0 \geq 1$ may be a positive integer defined either in a specification, or based on a UE reported capability. A starting position S and length L of a scheduled PDSCH in its scheduled slot may be the same for embodiments that operate at greater than or equal to 52.6 GHz as for embodiments that operate at less than 52.6 GHz.

As described herein, there may be a delay of one or more slots between a scheduling PDCCH and a scheduled PDSCH. This may enable a UE to complete decoding of the PDCCH before it receives the scheduled PDSCH. Accordingly, a UE may not need to receive and buffer all REs of a BWP at all time to facilitate not missing a PDSCH destined for itself. This may significantly reduce UE power consumption at high carrier frequency and large bandwidth as compared to frequencies less than 52.6 GHz. As may be appreciated, high carrier frequencies may include frequencies at or above 52.6 GHz (e.g., Terahertz).

FIG. 5 is a schematic flow chart diagram illustrating one embodiment of a method 500 for indicating a slot offset corresponding to a downlink control channel. In some embodiments, the method 500 is performed by an apparatus, such as the network unit 104. In certain embodiments, the method 500 may be performed by a processor executing program code, for example, a microcontroller, a microprocessor, a CPU, a GPU, an auxiliary processing unit, a FPGA, or the like.

The method 500 may include transmitting 502 first information to a user equipment indicating to the user equipment to receive a downlink data channel a slot offset after a scheduling downlink control channel, wherein: the slot offset comprises at least one slot; the first information indicates a resource allocation entry of a resource allocation table; and each resource allocation entry of the resource allocation table indicates that the slot offset comprises at least one slot.

In certain embodiments, the downlink data channel comprises a physical downlink shared channel. In some embodiments, the scheduling downlink control channel comprises a physical downlink control channel. In various embodiments, transmitting the first information comprises transmitting the first information via downlink control information.

In one embodiment, the slot offset is determined based on a downlink control information field. In certain embodiments, the downlink control information field indicates an index of a time resource allocation table. In some embodiments, the slot offset is a positive integer.

In various embodiments, the slot offset is contained in a radio resource control parameter PDSCH-TimeDomainResourceAllocation. In one embodiment, the slot offset comprises a first parameter and a second parameter. In certain embodiments, the first parameter comprises $K_0$ and the second parameter comprises $N_0$.

In some embodiments, the second parameter is predetermined. In various embodiments, the method 500 further comprises receiving second information from the user equipment that indicates a user equipment capability. In one embodiment, the second parameter is determined based on the user equipment capability. In certain embodiments, the second parameter is further determined based on an orthogonal frequency division multiplexing waveform numerology.

In some embodiments, the second parameter is a default parameter supported by a plurality of user equipments. In various embodiments, the second parameter is determined based on an orthogonal frequency division multiplexing waveform numerology.

FIG. 6 is a schematic flow chart diagram illustrating another embodiment of a method 600 for indicating a slot offset corresponding to a downlink control channel. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

The method 600 may include receiving 602 first information at a user equipment indicating to the user equipment to receive a downlink data channel a slot offset after a scheduling downlink control channel, wherein: the slot offset comprises at least one slot; the first information indicates a resource allocation entry of a resource allocation table; and each resource allocation entry of the resource allocation table indicates that the slot offset comprises at least one slot.

In certain embodiments, the downlink data channel comprises a physical downlink shared channel. In some embodiments, the scheduling downlink control channel comprises a physical downlink control channel. In various embodiments, receiving the first information comprises receiving the first information via downlink control information.

In one embodiment, the slot offset is determined based on a downlink control information field. In certain embodiments, the downlink control information field indicates an index of a time resource allocation table. In some embodiments, the slot offset is a positive integer.

In various embodiments, the slot offset is contained in a radio resource control parameter PDSCH-TimeDomainResourceAllocation. In one embodiment, the slot offset comprises a first parameter and a second parameter. In certain embodiments, the first parameter comprises $K_0$ and the second parameter comprises $N_0$.

In some embodiments, the second parameter is predetermined. In various embodiments, the method 600 further comprises transmitting second information from the user equipment that indicates a user equipment capability. In one embodiment, the second parameter is determined based on the user equipment capability. In certain embodiments, the second parameter is further determined based on an orthogonal frequency division multiplexing waveform numerology.

In some embodiments, the second parameter is a default parameter supported by a plurality of user equipments. In various embodiments, the second parameter is determined based on an orthogonal frequency division multiplexing waveform numerology.

In one embodiment, a method comprises: transmitting first information to a user equipment indicating to the user equipment to receive a downlink data channel a slot offset after a scheduling downlink control channel, wherein: the slot offset comprises at least one slot; the first information indicates a resource allocation entry of a resource allocation table; and each resource allocation entry of the resource allocation table indicates that the slot offset comprises at least one slot.

In certain embodiments, the downlink data channel comprises a physical downlink shared channel.

In some embodiments, the scheduling downlink control channel comprises a physical downlink control channel.

In various embodiments, transmitting the first information comprises transmitting the first information via downlink control information.

In one embodiment, the slot offset is determined based on a downlink control information field.

In certain embodiments, the downlink control information field indicates an index of a time resource allocation table.

In some embodiments, the slot offset is a positive integer.

In various embodiments, the slot offset is contained in a radio resource control parameter PDSCH-TimeDomainResourceAllocation.

In one embodiment, the slot offset comprises a first parameter and a second parameter.

In certain embodiments, the first parameter comprises $K_0$ and the second parameter comprises $N_0$.

In some embodiments, the second parameter is predetermined.

In various embodiments, the method further comprises receiving second information from the user equipment that indicates a user equipment capability.

In one embodiment, the second parameter is determined based on the user equipment capability.

In certain embodiments, the second parameter is further determined based on an orthogonal frequency division multiplexing waveform numerology.

In some embodiments, the second parameter is a default parameter supported by a plurality of user equipments.

In various embodiments, the second parameter is determined based on an orthogonal frequency division multiplexing waveform numerology.

In one embodiment, an apparatus comprises: a transmitter that transmits first information to a user equipment indicating to the user equipment to receive a downlink data channel a slot offset after a scheduling downlink control channel, wherein: the slot offset comprises at least one slot; the first information indicates a resource allocation entry of a resource allocation table; and each resource allocation entry of the resource allocation table indicates that the slot offset comprises at least one slot.

In certain embodiments, the downlink data channel comprises a physical downlink shared channel.

In some embodiments, the scheduling downlink control channel comprises a physical downlink control channel.

In various embodiments, the transmitter transmitting the first information comprises the transmitter transmitting the first information via downlink control information.

In one embodiment, the slot offset is determined based on a downlink control information field.

In certain embodiments, the downlink control information field indicates an index of a time resource allocation table.

In some embodiments, the slot offset is a positive integer.

In various embodiments, the slot offset is contained in a radio resource control parameter PDSCH-TimeDomainResourceAllocation.

In one embodiment, the slot offset comprises a first parameter and a second parameter.

In certain embodiments, the first parameter comprises $K_0$ and the second parameter comprises $N_0$.

In some embodiments, the second parameter is predetermined.

In various embodiments, the apparatus further comprises a receiver that receives second information from the user equipment that indicates a user equipment capability.

In one embodiment, the second parameter is determined based on the user equipment capability.

In certain embodiments, the second parameter is further determined based on an orthogonal frequency division multiplexing waveform numerology.

In some embodiments, the second parameter is a default parameter supported by a plurality of user equipments.

In various embodiments, the second parameter is determined based on an orthogonal frequency division multiplexing waveform numerology.

In one embodiment, a method comprises: receiving first information at a user equipment indicating to the user equipment to receive a downlink data channel a slot offset after a scheduling downlink control channel, wherein: the slot offset comprises at least one slot; the first information indicates a resource allocation entry of a resource allocation table; and each resource allocation entry of the resource allocation table indicates that the slot offset comprises at least one slot.

In certain embodiments, the downlink data channel comprises a physical downlink shared channel.

In some embodiments, the scheduling downlink control channel comprises a physical downlink control channel.

In various embodiments, receiving the first information comprises receiving the first information via downlink control information.

In one embodiment, the slot offset is determined based on a downlink control information field.

In certain embodiments, the downlink control information field indicates an index of a time resource allocation table.

In some embodiments, the slot offset is a positive integer.

In various embodiments, the slot offset is contained in a radio resource control parameter PDSCH-TimeDomainResourceAllocation.

In one embodiment, the slot offset comprises a first parameter and a second parameter.

In certain embodiments, the first parameter comprises $K_0$ and the second parameter comprises $N_0$.

In some embodiments, the second parameter is predetermined.

In various embodiments, the method further comprises transmitting second information from the user equipment that indicates a user equipment capability.

In one embodiment, the second parameter is determined based on the user equipment capability.

In certain embodiments, the second parameter is further determined based on an orthogonal frequency division multiplexing waveform numerology.

In some embodiments, the second parameter is a default parameter supported by a plurality of user equipments.

In various embodiments, the second parameter is determined based on an orthogonal frequency division multiplexing waveform numerology.

In one embodiment, an apparatus comprises: a receiver that receives first information indicating to the apparatus to receive a downlink data channel a slot offset after a scheduling downlink control channel, wherein: the slot offset comprises at least one slot; the first information indicates a resource allocation entry of a resource allocation table; and each resource allocation entry of the resource allocation table indicates that the slot offset comprises at least one slot.

In certain embodiments, the downlink data channel comprises a physical downlink shared channel.

In some embodiments, the scheduling downlink control channel comprises a physical downlink control channel.

In various embodiments, the receiver receiving the first information comprises the receiver receiving the first information via downlink control information.

In one embodiment, the slot offset is determined based on a downlink control information field.

In certain embodiments, the downlink control information field indicates an index of a time resource allocation table.

In some embodiments, the slot offset is a positive integer.

In various embodiments, the slot offset is contained in a radio resource control parameter PDSCH-TimeDomainResourceAllocation.

In one embodiment, the slot offset comprises a first parameter and a second parameter.

In certain embodiments, the first parameter comprises $K_0$ and the second parameter comprises $N_0$.

In some embodiments, the second parameter is predetermined.

In various embodiments, the apparatus further comprises a transmitter that transmits second information from the apparatus that indicates a user equipment capability.

In one embodiment, the second parameter is determined based on the user equipment capability.

In certain embodiments, the second parameter is further determined based on an orthogonal frequency division multiplexing waveform numerology.

In some embodiments, the second parameter is a default parameter supported by a plurality of user equipments.

In various embodiments, the second parameter is determined based on an orthogonal frequency division multiplexing waveform numerology.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a base station, the method comprising:

receiving, from a user equipment, capability information that indicates a user equipment capability;

adjusting a parameter in response to receiving the capability information, the adjusted parameter comprising a minimum number of slots between a scheduling downlink control channel and a downlink data channel; and transmitting first information to the user equipment indicating to the user equipment to receive the downlink data channel a slot offset after the scheduling downlink control channel, wherein:

the first information comprises an index indicating a resource allocation entry of a time resource allocation table;

the slot offset comprises at least one slot and is based at least in part on a sum of the adjusted parameter and an additional parameter, wherein a numerical value of the additional parameter is included in the resource allocation entry of the time resource allocation table separately from the adjusted parameter;

each resource allocation entry of the time resource allocation table indicates that the slot offset comprises at least one slot; and the resource allocation entry of the time resource allocation table further indicates at least one of: a duration of the downlink data channel, a timing of an initial symbol of the downlink data channel, a physical data shared channel (PDSCH) mapping type, or some combination thereof.

2. The method of claim 1, wherein the downlink data channel comprises a physical downlink shared channel.

3. The method of claim 1, wherein the scheduling downlink control channel comprises a physical downlink control channel.

4. The method of claim 1, wherein the slot offset is determined further based at least in part on a downlink control information field.

5. The method of claim 4, wherein the downlink control information field indicates an index of a time resource allocation table.

6. The method of claim 1, wherein the slot offset is contained in a radio resource control parameter PDSCH-TimeDomainResourceAllocation.

7. The method of claim 1, wherein the additional parameter comprises $K_0$ and the adjusted parameter comprises $N_0$.

8. The method of claim 1, wherein adjusting the parameter comprises changing the parameter from a predetermined value to an adjusted value.

9. The method of claim 8, wherein the predetermined value is a default parameter value supported by a plurality of user equipments.

10. The method of claim 9, wherein the predetermined value is determined based on an orthogonal frequency division multiplexing waveform numerology.

11. The method of claim 1, wherein the numerical value of the additional parameter is greater than or equal to a numerical value of the adjusted parameter.

12. The method of claim 1, wherein the additional parameter is based on an orthogonal frequency division multiplexing waveform numerology of the downlink data channel.

13. The method of claim 1, wherein the capability information comprises a time for the UE to decode downlink control information received in the scheduling downlink control channel.

14. A base station, comprising:

at least one memory; and at least one processor coupled with the at least one memory and configured to cause the base station to:

receive, from a user equipment, capability information that indicates a user equipment capability;

adjust a parameter in response to receiving the capability information, the adjusted parameter comprising a minimum number of slots between a scheduling downlink control channel and a downlink data channel; and transmit first information to the user equipment indicating to the user equipment to receive the downlink data channel a slot offset after the scheduling downlink control channel, wherein:

the first information comprises an index indicating a resource allocation entry of a time resource allocation table;

the slot offset comprises at least one slot and is based at least in part on a sum of the adjusted parameter and an additional parameter, wherein a numerical value of the additional parameter is included in the resource allocation entry of the time resource allocation table separately from the adjusted parameter;

each resource allocation entry of the time resource allocation table indicates that the slot offset comprises at least one slot; and the resource allocation entry of the time resource allocation table further indicates at least one of: a duration of the downlink data channel, a timing of an initial symbol of the downlink data channel, a physical data shared channel (PDSCH) mapping type, or some combination thereof.

15. The base station of claim 14, wherein the at least one processor is configured to cause the base station to transmit the first information via downlink control information.

16. The base station of claim 14, wherein adjusting the parameter comprises changing the parameter from a predetermined value, and the predetermined value is determined based on an orthogonal frequency division multiplexing waveform numerology.

17. A user equipment (UE), comprising:

at least one memory; and at least one processor coupled with the at least one memory and configured to cause the UE to:

transmit, to a base station, capability information that indicates a capability of the UE; and receive first information indicating to the UE to receive a downlink data channel a slot offset after a scheduling downlink control channel, wherein:

the first information comprises an index indicating a resource allocation entry of a time resource allocation table;

the slot offset comprises at least one slot and is based at least in part on a sum of a parameter that is adjusted by the base station in response to receiving the capability information and an additional parameter, wherein a numerical value of the additional parameter is included in the resource allocation entry of the time resource allocation table separately from the adjusted parameter and a minimum number of slots between a scheduling downlink control channel and a downlink data channel;

each resource allocation entry of the time resource allocation table indicates that the slot offset comprises at least one slot; and the resource allocation entry of the time resource allocation table further indicates at least one of: a duration of the downlink data channel, a timing of an initial symbol of the downlink data channel, a physical data shared channel (PDSCH) mapping type, or some combination thereof.

18. The UE of claim 17, wherein the downlink data channel comprises a physical downlink shared channel.

19. The UE of claim 17, wherein the scheduling downlink control channel comprises a physical downlink control channel.

20. The UE of claim 17, wherein the at least one processor is configured to cause the UE to receive the first information via downlink control information.

* * * * *